United States Patent Office 3,252,549
Patented May 24, 1966

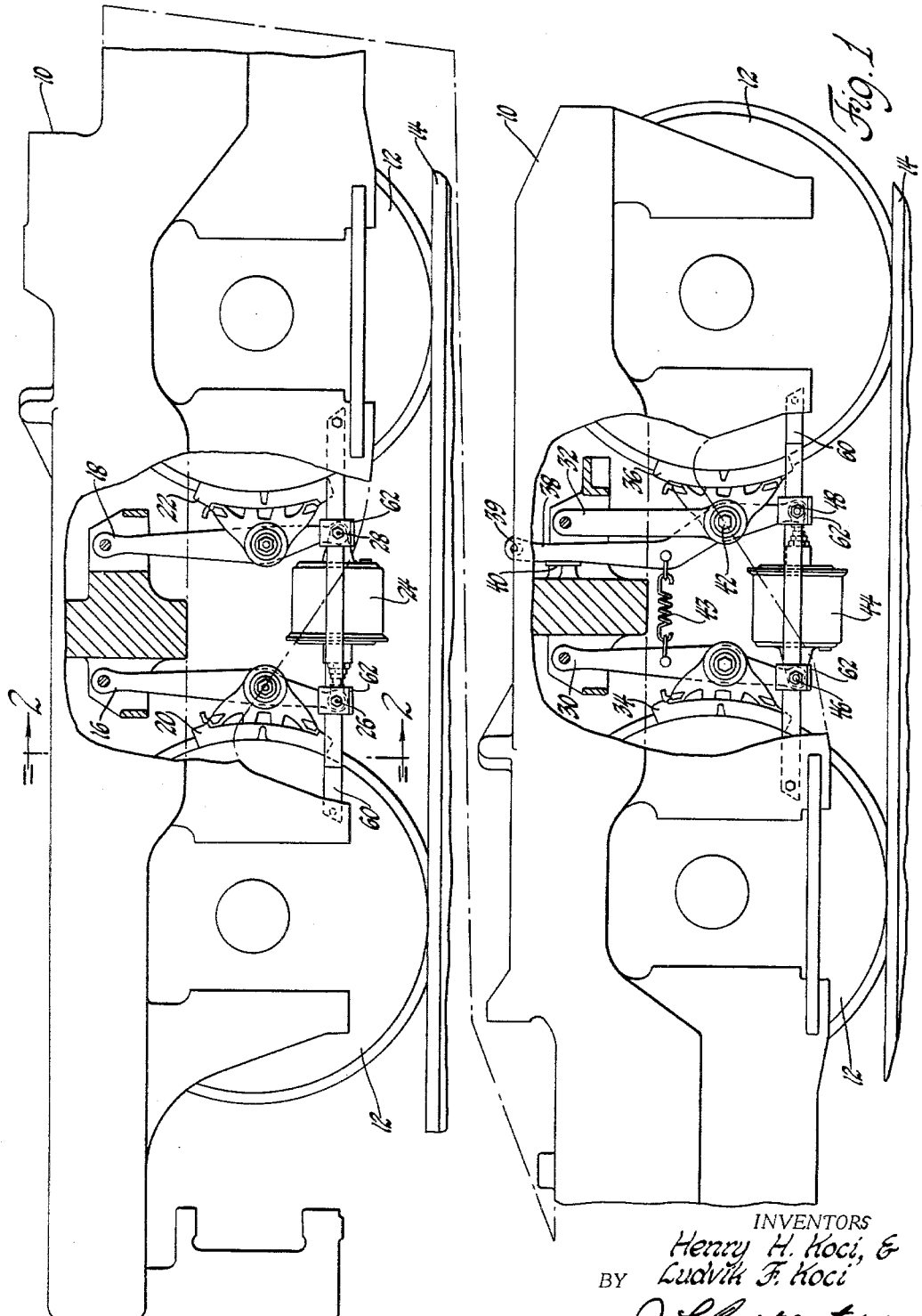

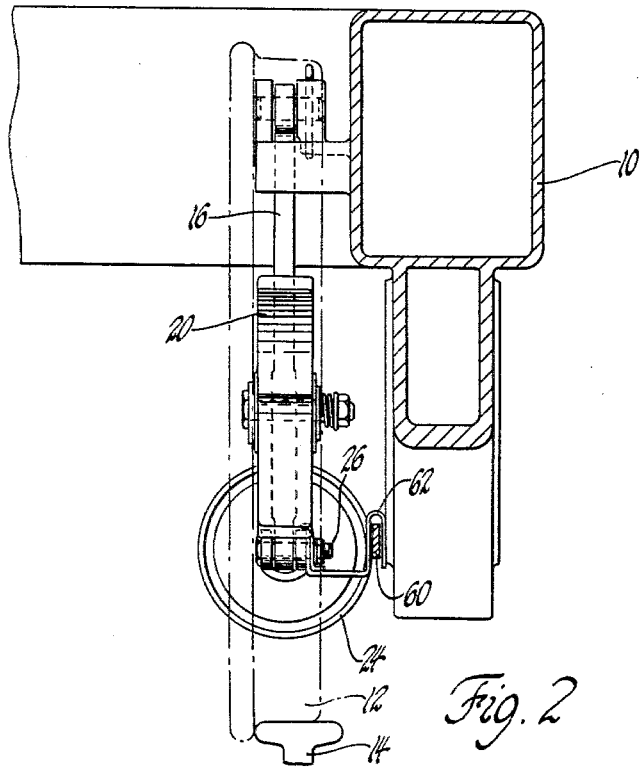
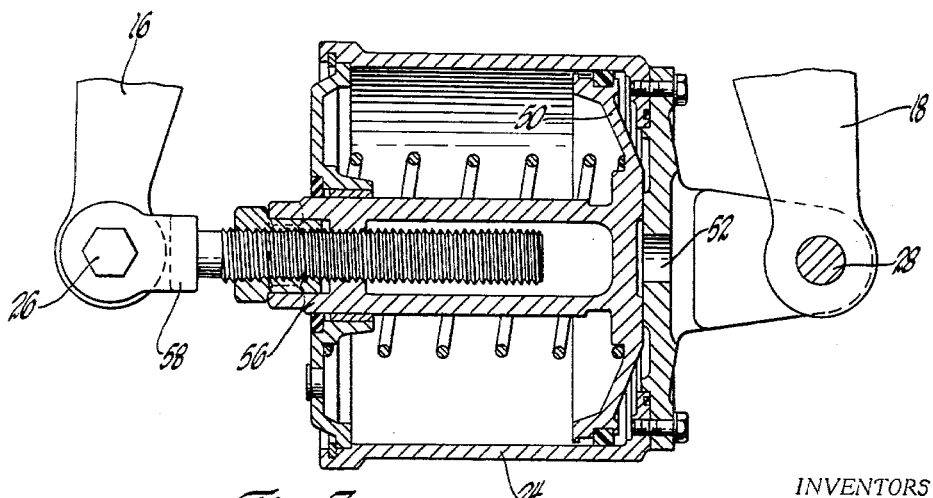

3,252,549
BRAKE RIGGING
Henry H. Koci, Western Springs, and Ludvik F. Koci, Downers Grove, Ill., assignors to General Motors Corporation, Detroit, Mich., a corporation of Delaware
Filed May 4, 1964, Ser. No. 364,440
6 Claims. (Cl. 188—107)

This invention relates to a brake rigging and particularly to a railway vehicle brake rigging wherein the braking force is applied to each wheel of the vehicle by only one brake shoe.

This invention provides a brake rigging which is especially adapted to utilize the recently innovated composition brake shoes which have an efficiency much higher than the iron brake shoes heretofore considered standard equipment on locomotives.

As this invention is illustrated in the drawings, it comprises two brake rigging units on each side of a 4-axle railway vehicle truck, one pair of units being suspended between the forward pair of axles and the other between the rear pair. Each of the units is adapted for the customary pneumatic brake operation and one pair of the units is adapted for hand brake operation.

Various other features of this brake rigging which enhance its advantageousness include brake cylinders suspended by and floating between the brake shoe hangers, a piston rotatable within each cylinder to adjust the slack within the brake rigging, and stabilizing means to prevent uneven wear of the brake shoes.

The details as well as other objects and advantages of this invention are set out in the remaining portion of the specification and in the drawings in which:

FIGURE 1 is a side elevational view of a 4-axle, 8-wheel truck having the brake rigging of this invention applied thereto and in which, in order to accommodate the truck on the drawing, one end of the truck is shown horizontally above the other end of the truck;

FIGURE 2 is an end elevational view of the brake rigging taken along line 2—2 of FIGURE 1; and FIGURE 3 is a sectional view of an exemplary embodiment of the brake cylinders.

Referring first to FIGURE 1, a 4-axle truck frame 10 is supported on each side by four wheels 12 which travel upon a track 14.

As shown in the upper portion of FIGURE 1, a pair of hangers 16 and 18 is swingingly suspended from the frame 10 between one pair of wheels 12. Brake shoes 20 and 22 are secured to hangers 16 and 18 and are adapted, upon expansion of the pair of hangers 16 and 18, to exert a braking force against wheels 12.

A brake cylinder 24 is suspended by hangers 16 and 18 through pivotal connections 26 and 28. As explained in further detail below, brake cylinder 24 is adapted, upon an increase in pressure therein, to cause expansion of the pair of hangers 16 and 18 to force brake shoes 20 and 22 against wheels 12.

The other unit of the brake rigging is shown in the lower portion of FIGURE 1. A pair of hangers 30 and 32, having brake shoes 34 and 36 secured thereto, is swingingly suspended from frame 10 between the other pair of wheels 12. A hand brake lever 38 abuts a reaction point 40 on frame 10 and is pivotally connected, as at 42, to hanger 32 and suspended thereby. A hole 39 is formed in hand brake lever 38 so that the customary chain and other operating linkage (not shown) may be connected thereto. A spring 43 interconnects hanger 30 and hand brake lever 38 and biases hand brake lever 38 against reaction point 40.

A second brake cylinder 44 is suspended by hanger 30 and hand brake lever 38 through pivotal connections 46 and 48. Brake cylinder 44 is adapted, upon an increase in pressure therein, to expand hanger 30 and hand brake lever 38. Hand brake lever 38 is pressed against reaction point 40 and thereby causes hanger 32 to swing away from hanger 30, forcing brake shoes 34 and 36 against their associated wheels 12.

When the brakes are applied through hand operation, the linkage connected through hole 39 pulls hand brake lever 38 away from reaction point 40. Hand brake lever 38 pivots about 42, and, acting through cylinder 44, causes expansion of hangers 30 and 32 to force brake shoes 34 and 36 against their associated wheels 12.

An exemplary embodiment of a brake cylinder is shown in FIGURE 3 and, inasmuch as brake cylinders 24 and 44 may be identical, the explanation thereof is limited to cylinder 24. A piston 50 is located within cylinder 24 and adapted to move, toward the left in FIGURE 3, upon application of compressed air against piston 50 within cylinder 24 through an opening 52. Cylinder 24 moves toward the right concomitantly with movement of piston 50 toward the left. These combined movements cause expansion of hangers 16 and 18 which swing to force brake shoes 20 and 22 against their associated wheels 12.

The stem 56 of piston 50 is threaded upon a member 58 which is connected, by 26, to hanger 16. Piston 50 and its stem 56 may be rotated about member 58 to adjust piston 50 within cylinder 24. Rotation of piston 50 takes up the slack within the brake rigging and provides for even wear of piston 50 within cylinder 24.

Referring to FIGURES 1 and 2, stabilizer bars 60 are secured to truck frame 10 and extend adjacent cylinders 24 and 44. Connecting straps 62 are secured to hangers 16, 18, and 30, and to hand brake lever 38 by pivotal connections 26, 28, 46, and 48. Connecting straps 62 are formed with an inverted U-shaped portion to loop over stabilizer bar 60 and prevent transverse movement of the brake rigging relative to wheels 12 while allowing for longitudinal movement of the brake rigging whereby the brake shoes 20, 22, 34, and 36 are maintained in proper position relative to wheels 12.

This invention offers an improvement over the brake riggings heretofore available in that it is designed to take full advantage of the composition brake shoes which can apply a braking force approximately double that of the iron brake shoes. Previously, when composition brake shoes were utilized, they were incorporated within the standard brake rigging and applied generally two to a wheel. This, of course, necessitated twice the mechanism required by the brake rigging provided by this invention.

This invention offers an additional advantage over the brake riggings heretofore available in that the simplified hand brake arrangement takes full advantage of the other components of the brake rigging. Only one additional lever and a reaction point on the frame are necessary to convert the pneumatic unit shown in the upper portion of FIGURE 1 to the combined pneumatic-manual unit shown in the lower portion of FIGURE 1. The hand brake operation utilizes the reaction of brake shoe 36 against its associated wheel 12 and the reaction of piston 50 against cylinder 24 to force brake shoe 34 against its associated wheel 12.

We claim:

1. In a railway vehicle including a frame supported on one side by a pair of wheels adjacently located and substantially coplanar, said frame having a reaction point located thereon, a brake rigging secured to said frame between said wheels comprising first and second hangers swingingly suspended from said frame, each adjacent one of said wheels; a pair of brake shoes, each secured to one of said hangers and adapted upon swinging movement of its associated hanger to apply a braking force to its associated wheel; a hand brake lever pivotally connected to said first hanger, said hand brake lever having a portion thereof adapted to bear against said reaction point on said frame; and means interconnecting said hand brake lever and said second hanger including a cylinder, a pivotal connection between said cylinder and one of said second hanger and said hand brake lever, a piston in said cylinder moveable axially therewithin upon a change in pressure within said cylinder, a pivotal connection between said piston and other of said second hanger and said hand brake lever, power brake applying means through which to effect a change in pressure within said cylinder whereby relative axial movement may be imparted between said piston and said cylinder which may be translated through said pivotal connections and said hand brake lever to swinging movement of said hangers causing application of a braking force to said wheels by said brake shoes, and hand brake applying means by which said hand brake lever may be pivoted about its connection with said first hanger away from said reaction point to impart swinging movement to said hangers through said piston, said cylinder and said pivotal connections causing application of a braking force to said wheels by said brake shoes.

2. The brake rigging of claim 1 which further includes biasing means adapted to bias said hand brake lever against said reaction point on said frame.

3. The brake rigging of claim 2 wherein said biasing means comprises a spring interconnecting said second hanger and said hand brake lever.

4. The brake rigging of claim 1 which further includes a stabilizer bar secured to said frame adjacent said pivotal connections and strap means interconnecting said stabilizer bar and said pivotal connections to limit transverse movement of said brake rigging relative to said wheels while allowing for longitudinal movement of said brake rigging relative to said wheels, said strap means being secured to said pivotal connections and having a portion extending transversely between said brake rigging and said stabilizer bar and an inverted U-shaped portion superjacent said stabilizer bar.

5. In a railway vehicle including a frame supported on one side by a pair of wheels adjacently located and substantially coplanar, said frame having a reaction point located thereon, a brake rigging secured to said frame between said wheels comprising first and second hangers swingingly suspended from said frame, each adjacent one of said wheels; a pair of brake shoes, each secured to one of said hangers and adapted upon swinging movement of its associated hanger to apply a braking force to its associated wheel; a hand brake lever pivotally connected to said first hanger, said hand brake lever having a portion thereof adapted to bear against said reaction point on said frame; and means interconnecting said hand brake lever and said second hanger including a cylinder, a pivotal connection between said cylinder and one of said second hanger and said hand brake lever, a piston in said cylinder moveable axially therewithin upon a change in pressure within said cylinder, said piston being rotatable within said cylinder, a member to which said piston is threadedly secured whereby the relative axial position of said piston within said cylinder may be adjusted by rotation of said piston within said cylinder about said member to thereby take up slack in said rigging, a pivotal connection between said member and the other of said second hanger and said hand brake lever, power brake applying means through which a change in pressure within said cylinder may be effected whereby relative axial movement may be imparted between said piston and said cylinder which may be translated through said member, said pivotal connections, and said hand brake lever to swinging movement of said hangers causing application of a braking force to said wheels by said brake shoes, and hand brake applying means by which said hand brake lever may be pivoted about its connection with said first hanger away from said reaction point to impart swinging movement to said hangers through said piston, said cylinder and said pivotal connections causing application of a braking force to said wheels by said brake shoes.

6. For a railway vehicle having a frame supported at one side by two pairs of adjacently located and substantially coplanar wheels, said frame having a reaction point located thereon, a brake rigging adapted to be suspended from said frame comprising first and second hangers adapted to be swingingly suspended from said frame between the wheels of one pair of said wheels, each hanger adjacent one wheel of said pair, third and fourth hangers adapted to be swingingly suspended from said frame between the wheels of the other pair of said wheels, each hanger adjacent one wheel of said other pair; a brake shoe secured to each of said hangers and adapted upon swinging movement of its associated hanger to apply a braking force to its associated wheel; a hand brake lever adapted to bear against said reaction point on said frame, said hand brake lever being pivotally connected to said first hanger, spring means connecting said second hanger and said hand brake lever and adapted to bias said hand brake lever against said reaction point on said frame; means by which said hand brake lever may be pivoted; first and second cylinders, a pivotal connection between said first cylinder and one of said second hanger and said hand brake lever, a pivotal connection between said second cylinder and one of said third and fourth hangers; a pair of pistons, each in one of said cylinders and movable axially therewithin upon a change of pressure therewithin; a pair of members, each threadedly secured to one of said pistons, a pivotal connection between the member associated with said first cylinder and the other of said second hanger and said hand brake lever, a pivotal connection between the other member and the other of said third and fourth hangers; means through which a change in pressure within said cylinders may be effected whereby relative axial movement may be imparted between the associated pistons and cylinders which may be translated to swinging movement of said hangers causing application of a braking force to said wheels by said brake shoes; a pair of stabilizer bars, each adapted to be secured to said frame adjacent one of said cylinders; and four connecting straps, each secured to one of said pivotal connections, each of said straps having a portion to extend transversely between its associated pivotal connection and its associated stabilizer bar and having an inverted U-shaped portion to be superjacent said stabilizer bar to prevent transverse movement of said brake rigging relative to said wheels while allowing for longitudinal movement of said brake rigging relative to said wheels.

References Cited by the Examiner

UNITED STATES PATENTS

| | | | |
|---|---|---|---|
| 1,040,846 | 10/1912 | Barber | 188—53 |
| 2,112,530 | 3/1938 | Holloway | 188—33 |
| 2,846,032 | 8/1958 | Buvelot | 188—233.3 X |
| 3,004,632 | 10/1961 | Mueller | 188—153 X |

FOREIGN PATENTS 1,081,994  6/1954  France.

MILTON BUCHLER, *Primary Examiner.*

DUANE A. REGER, *Examiner.*